United States Patent [19]

Dunning et al.

[11] 4,323,790

[45] Apr. 6, 1982

[54] ELASTIC STORAGE AND SYNCHRONIZATION CONTROL APPARATUS FOR USE IN A TELEPHONE SWITCHING SYSTEM

[75] Inventors: Stephen C. Dunning, Cary; Joseph E. Sutherland, Raleigh, both of N.C.

[73] Assignee: International Telephone and Telegraph Corporation, New York, N.Y.

[21] Appl. No.: 156,713

[22] Filed: Jun. 5, 1980

[51] Int. Cl.³ .............................................. H04J 3/07
[52] U.S. Cl. .................................................. 370/102
[58] Field of Search ........................ 370/102; 375/118

[56] References Cited

U.S. PATENT DOCUMENTS

| | | | |
|---|---|---|---|
| 3,868,481 | 2/1975 | Patrusky et al. | 370/102 X |
| 4,270,203 | 5/1981 | Collins et al. | 370/102 |

FOREIGN PATENT DOCUMENTS 2846960  1/1980  Fed. Rep. of Germany ...... 370/102

Primary Examiner—Thomas W. Brown
Attorney, Agent, or Firm—John T. O'Halloran

[57] ABSTRACT

An elastic storage circuit employs a first in/first out (FIFO) memory which stores data contained in a serial stream in a plurality of locations, each of which is associated with a unique address. The storage locations operate to store both the data and the address. A word address counter generates a five bit address code to accompany the data bits as stored in the FIFO. If a chronic increase or decrease in the frequency rate of the data occurs, the FIFO will overflow or underflow. This condition is detected by suitable detectors which create an alarm to completely reset the entire contents of the memory and to refill a portion of the memory over a given interval sufficient to permit the system to recover from the slip in the data rate and to thereafter synchronously read the data together with the address identification from the FIFO.

12 Claims, 1 Drawing Figure

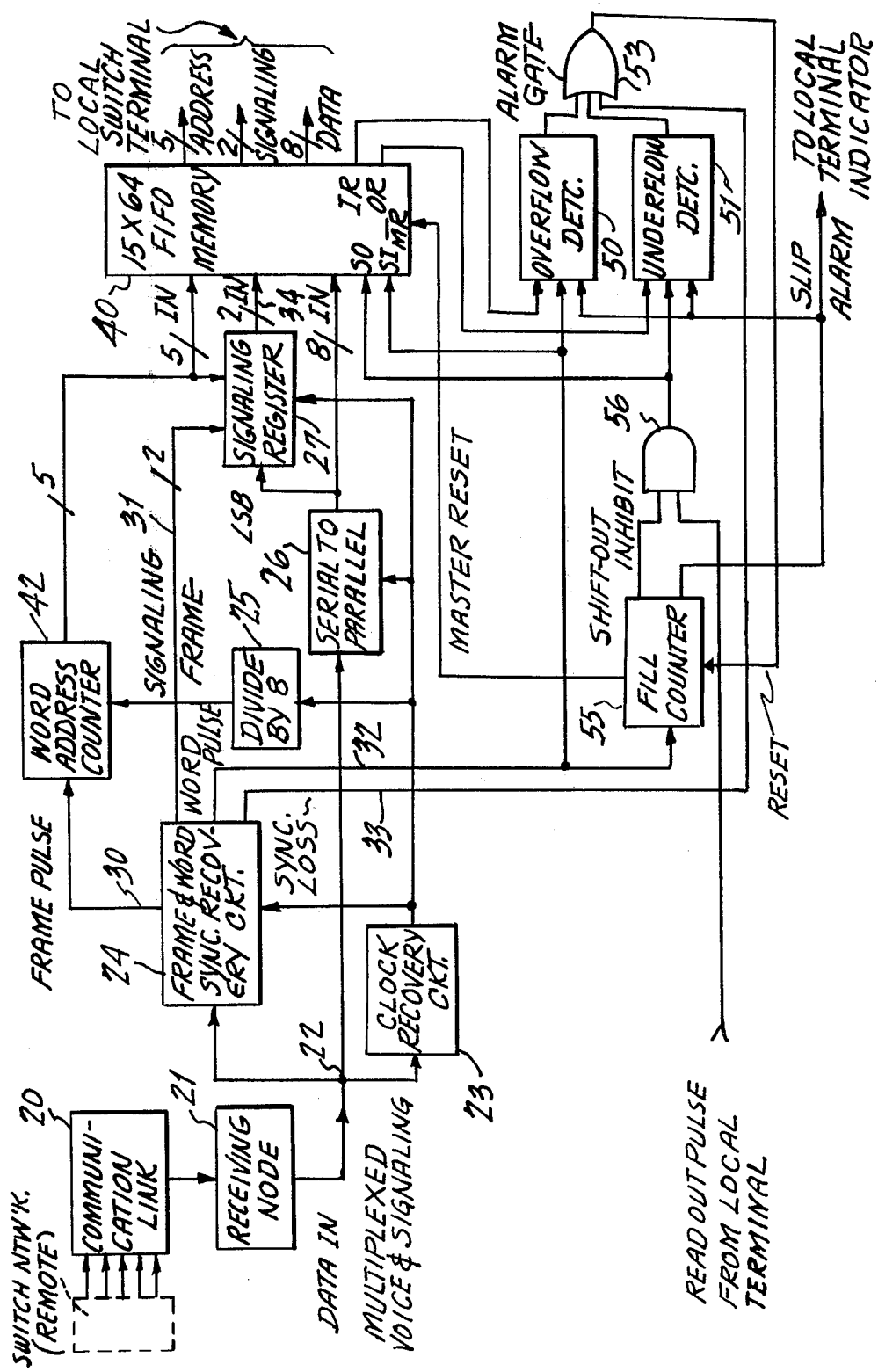

ELASTIC STORAGE AND SYNCHRONIZATION CONTROL APPARATUS FOR USE IN A TELEPHONE SWITCHING SYSTEM

BACKGROUND OF THE INVENTION

This invention relates to elastic storage apparatus and more particularly to such apparatus for storing digital information according to predetermined synchronization patterns.

A telephone system is a prime example of a communications network where information is transmitted between various points or nodes according to a switching path set up by the communications network in order to enable one subscriber to communicate with another. In such systems, synchronous time-division multiplexed data is transferred at a constant rate between the various nodes so that the amount of information entering one terminal or node is in balance with the information exiting that same node. Each terminal of the transmission link is provided with a local clock source adapted to control operations at that particular terminal. In regard to the system in general, it is desirable that a common stable clock frequency be provided to all nodes which form part of the synchronous network. At the transmitting terminal, the local clock operates to generate bits and framing pulses which serve to align outgoing data in appropriate time slots. The data is further assembled within frames where each frame has a fixed number of bits and framing bits are further inserted in order to enable the receiving terminal to disassemble the data and recover the transmitted information in each of the time slots.

In a practical system, while the average frequency of each of the terminal clocks can be maintained relatively constant, the instantaneous phase relationship between the information streams transmitted and received are not known and are subjected to random variations generally referred to as phase jitter. Phase jitter can be considered equivalent to short term frequency errors which tend to average out over long periods of time, but which can adversely affect short term data.

Basically, any increase in input frequency relative to output frequency essentially means that more data is entering a node than is leaving a node. Both conditions require that some information be stored temporarily at each node in a so-called elastic store to allow for the phase jitter and unknown phase relationships. For example, typical transmission links such as cables and so on are associated with propagation delay and behave as a delay line for the data train. In any event, even though the clocks are synchronized in frequency, the data can be out of frame synchronization because of the propagation delay on the links carrying the data between a transmit and a receiving terminal. In such systems, the incoming data train can have any phase and frame relationship with respect to the local clock. To compensate for this problem, as well as phase jitter on the data stream, one must delay the data train at the receiving terminal according to the random variation which can occur. Circuit configurations for providing such a delay are sometimes referred to in the prior art as elastic stores, which circuits can handle both the delay for frame synchronizing the data stream and the delay for compensating other phase changes which may be due to temperature and so on. The amount of delay or storage required by such a system is typically a function of magnitude of the phase jitter, propagation delay and the acceptable slip rate, as described below.

Data information streams are constructed with formats which allow the receiving node to identify the start of a message word and to further distinguish each bit of the word. Accordingly, bit, word and frame identification can all be extracted from the information stream. When phase shifts due to jittering are not cancelled or compensated for, the accumulated data shift may cause the elastic store to empty or overflow and hence, a "slip" is said to have occurred. The basic function of an elastic store apparatus is to minimize the loss of information caused by such slips. Basically, the receiving terminal must initiate an operation to relocate the incoming framing signal when it appears at the output of the store and to realign this newly located framing signal with the local clock framing signal.

According to prior art techniques, the delayed framing signal is first located, the local clock framing pulse is then located and one can determine the phase lead or lag of the delayed framing signal with respect to the clock pulse. Once the actual delay is calculated, the store is then increased or decreased an appropriate amount to correct the delay of the incoming frame signal to re-establish frame synchronization. Circuitry for doing this is relatively complicated.

Other techniques such as that shown in U.S. Pat. No. 3,887,769 entitled FRAME SYNCHRONIZATION OF ELASTIC DATA BIT STORES issued on June 3, 1975 to M. P. Cichetti, Jr. et al depicts techniques employing shift register stages which delay incoming frames of data to align each frame with framing pulses of a local clock. The circuitry operates to compensate for jitter of the incoming data stream by providing a variable delay obtained through a counter whose count defines the register output stage. In this type of system, framing synchronization is initially obtained or regained when lost by first determining when the framing signal shifts to the output stage and then the count is advanced at the incoming bit rate to define each successive stage when the framing signal shifts to the stage and to halt any advance when a local framing pulse is generated. If the count in this system advances to define a final one of the register stages, the count is then reduced by a number equal to the number of bits in a frame. If the count is decreased to define an initial stage, the count is increased by the same number.

The system depicted in the above noted reference is extremely complicated and requires a large number of components to implement elastic storage and the attendant compensation.

It is therefore an object of the present invention to provide improved apparatus for elastic storage and synchronization control of serial digital data.

BRIEF DESCRIPTION OF THE PREFERRED EMBODIMENT

An elastic storage and synchronization apparatus for receiving a serial multiplexed signal, having a plurality of words, each of the same number of bits, with the words comprising a data frame having a fixed number of bits, comprising a first-in-first-out memory (FIFO) circuit having a plurality of storage locations for storing at each location a given number of bits corresponding to the number of bits in each of the words, plus additional address bits manifesting the location of the word in the serial data stream, a timing circuit responsive to the multiplexed signal for providing clock pulses indicative of the bit rate in the signal, an address access circuit coupled to the memory circuit and responsive to the clock pulses to provide at an output a plurality of unique address codes capable of identifying each word, a capacity detecting circuit coupled to the memory and operative to detect the number of stored words in the memory to determine a change in the rate of received data as compared to a desired rate, including a circuit responsive to a major change to clear all bits stored in the memory locations, and a refilling circuit coupled to the capacity detecting circuit to fill a given number of the locations during a predetermined interval necessary to compensate for the change in rate.

BRIEF DESCRIPTION OF THE SOLE FIGURE

The sole FIGURE depicts a detail block diagram of an elastic storage and synchronization control apparatus according to this invention.

DETAILED DESCRIPTION OF INVENTION

Referring to the FIGURE, there is shown a detailed block diagram of an elastic storage apparatus according to this invention. As indicated above, such apparatus is particularly useful in a synchronous time division multiplex data transmission system.

At the onset, it is noted that certain lead lines such as 31 have a transverse line drawn through the lead line with a number above the transverse line. This number stands for the number of leads contained in the line. Hence, such lines are really cables and consist of a plurality of lines as line 31 is actually two wires. This nomenclature is conventionally used and is understood by those skilled in the art and has been employed in the FIGURE where necessary for a clearer understanding and for ease of illustration.

A telephone switching network is indicative of a typical type of system which employs digital data for transmission and reception between subscriber terminals and which data is conventionally multiplexed in order to afford the optimum use of a communications link 20 which may be a cable, an optical fiber, and so on.

The communications link may operate to couple one switching network, as a remote network, to another network, as a local network or local terminal. For purposes of explanation, the local terminal is associated with a receiving node 21 which receives incoming data from the communications link and which data is to be used by the local terminal. Hence, the receive node 21 may include line amplifiers and other components such as equalizers and so on, to insure impedance matching and provide amplification to the data signals emanating from the communications line 20.

As shown in the FIGURE, the data input is a multiplexed signal containing voice and signalling data. In a telephone communications system, the signalling data is included, as will be explained, in the multiplexed signal and is necessary to indicate to the terminal the status of each channel associated with the multiplexed signal. A channel may be reserved for a subscriber line or for a trunk, which trunk serves as a data bus between terminals and hence, operates as the communications link 20.

As is known in the telephone art, signal bits are employed to determine the idle/busy status of a trunk or the on/off hook status of a line subscriber. Hence, one bit associated with each channel, as will be explained, is referred to as an A bit and is employed to determine the idle/busy status of a line or trunk. Another bit is referred to as a B bit and is used by the switchboard to perform testing of various line circuits or can be employed to designate other status conditions associated with a subscriber line.

A typical type of multiplexed voice and signaling format is known as the DS-1 signal which is employed by many telephone systems, including those manufactured by International Telephone and Telegraph Corporation, the Assignee herein.

The data input to the elastic storage apparatus arriving at terminal 22 is a multiplexed signal having the following characteristics:

The incoming signal or data bit stream is a serial signal having a signaling rate of 1.544 megabits (mb/s) per second and contains 193-bit frames consisting of twenty-four eight-bit bytes. Hence, a frame of data constitutes twenty-four eight-bit words with a last bit designated as a frame bit, which frame bit is the 193rd bit in each frame. The data as transmitted varies according to frame number in the DS-1 format. For example, during frames 1 to 5, each of the twenty-four channels represents voice data arranged in an eight-bit format for each channel and encoded according to a PCM format.

In the DS-1 format, frame 6 is a signaling frame and during frame 6, the least significant bit or the eighth bit of each eight-bit word is indicative of the A signal bit. Hence, during frames 6, 18, 30, 42 and so on, the least significant bit of each eight-bit word is indicative of the A bit as above described. During frames 12, 24, 36 and so on, the least significant bit of each word is indicative of the B bit. Hence, as one can see, during signaling frames such as 6, 12, 18, 24 and so on, the least significant bit of each data word alternates between A and B bits.

As above indicated, a frame consists of 193 bits with the last bit designated as a frame bit. In a multiplex system, the transmitted signal also contains a framing pattern. Hence, each frame is associated with a frame bit and a framing pattern is repeated for every twelve frames. In this manner, the local terminal can recognize the framing pattern and can then assure that the data is being interpreted in the correct sequence. The framing pattern indicative of the framing bits for the DS-1 format is the binary pattern 100011011100. Thus, as one can see, this framing pattern represents a twelve frame interval and enables the receiving terminal to determine the proper bit sequence and hence, the proper bit order, as will be further explained.

In any event, it should be clear that once the framing pattern is known and determined, all data is immediately available and therefore, the terminal recognizes each eight-bit word and hence, each channel represented by the word, knows the start and end of each frame and also can distinguish and determine signaling frames from data frames, as above described. This data signal is the signal which is applied to terminal 22 of the FIGURE. It will be understood after a review of the operation of this circuit, that any other typical multiplex signal could be employed with the elastic store technique according to this invention.

The input data signal at terminal 22 is applied to a module 23 designated as a clock recovery circuit. The clock recovery circuit 23 generates a 1.544 MHz bit clock which is phase locked with the incoming bits in the data stream. Techniques for implementing clock recovery circuits as 23 are well known in the telephony art.

Essentially, the output clock signal from circuit 23 is applied to a frame and word sync recovery circuit 24, to a divide by eight circuit 25, to a serial to parallel converter 26, and to a signaling register 27.

The data input is also applied to the frame and word sync recovery circuit 24, which as above indicted, also receives the recovered bit clock pulses. The frame and word sync recovery circuit 24 is also a well known module as widely employed in the telephony industry and basically functions as follows:

The frame and word sync recovery circuit provides four outputs respectively designated as frame pulse on lead 30, signaling frame on lead 31, word pulse on lead 32 and sync loss on lead 33. The frame and word sync recovery circuit receives incoming data which, for example, may be applied to a counter which is triggered by the recovered clock. The counter is a free-running counter and has the capability of specifying 193 times 12 unique states or 2,316 states indicative of all bits in twelve frames. This counter is employed together with a shift register responsive to the input data to interrogate the input data over the twelve frame interval to accurately determine and locate the above described frame pattern of 100011011100. Once this pattern is captured, the counter then knows the location of each and every bit as each of the 2,316 bits. Hence, as is ascertained, once the frame pattern has been captured, the sync loss lead 33 is in a low state indicative of the fact that the frame and word sync recovery circuit 24 has recognized the framing pattern and all data coming into the terminal is specified and known.

If, however, a framing pattern is not recognized, the sync loss lead 33 becomes high, immediately notifying the terminal that all incoming data is not synchronized and, as will be explained, various alarm conditions are implemented.

The frame and word sync recovery circuit 24, upon recognition of the framing pattern, can now provide an output on lead 32 which is indicative of each eight bit word and hence, the word pulse output on lead 32 is a pulse which occurs for each eight bit word in every frame. The circuit 24 also provides an output on lead 31, which output occurs only during signaling frames such as frames 6, 12, 18 and so on. The circuit 24 also produces an output on lead 30 which is one pulse for each frame contained in the data stream. It is, of course, easily understood how one can implement all functions of the frame and word sync recovery circuit 24 by the use of shift registers, binary counters, suitable decoding gates and in general, typical digital circuitry based on the above description of the data input signal being processed.

As specified above, the input data as entering the receiving node 21 may contain phase jitter and hence, such jitter will interfere with the operation of the circuit 24, which upon the receipt of excessive phase jitter, will lose sync and hence provide an output on the sync loss lead 33. It is, of course, the function of the elastic store apparatus to reframe and synchronize the data, as will be explained.

The input data, apart from being directed to the clock recovery circuit 23 and the frame and word sync recovery circuit 24 is also applied to an input of the serial-to-parallel converter 26. The converter 26 is a serial to parallel shift register which operates to convert the serial data stream into eight bit output words indicative of each word in the twenty-four channel signal. The shift register 26 is activated by the clock recovery circuit 23 which, as was explained, is synchronized to the incoming bit stream. If the data is in sync, then each eight bit word emanating from the register 26 is indicative of the data associated with each channel.

The eight bit parallel output from the serial-to-parallel register 26 is applied to the input lines of a First In First Out (FIFO) memory 40. The structure and operation of the memory 40 will be further described. A second output from the serial to parallel register 26 designated as LSB (least significant bit) is applied to the input of a signaling register 27. As above described, another input to register 27 is obtained from the clock recovery circuit 23. Register 27 also receives the two inputs indicative of the signaling frame on cable 31. The function of the signaling register 27 is as follows:

As indicated during signaling frames such as frames 6, 18, 30 and so on, the A bit signal is transmitted as the least significant bit of each eight bit word, while during frames 12, 24, 36, the B bit signal is transmitted as the least significant bit. The signaling register 27 basically comprises two separate twenty-four bit recirculating shift registers. One register contains each A bit for each channel, while the other register contains each B bit for each channel. The appropriate register is accessed by the applicable signaling frame from cable 31 indicative of the A signal frames or B signal frames. During signaling frames, the least significant bit is latched by the signaling register in order to reconstruct the two signaling highways, one for A bits and one for B bits, with each bit indicative of the status of each of the twenty-four channels contained in the multiplexed signal. The two bit output is also directed to the memory input on cable 34.

A word address counter 42 generates a five bit code to accompany the eight bits of voice and the two bits of signaling which are stored, as will be explained, in the FIFO 40. The word address counter receives a divided clock signal from the divide by eight circuit 25. The divide by eight circuit is a binary counter which operates to divide the input clock by a factor of eight and hence, produces an output pulse for every eight clock bits. Thus, the output pulse is indicative of a word. The word address counter operates to provide five bit binary addresses to tag the words as they shift through the FIFO at sixty-four unique storage locations, where each of the sixty-four locations is capable of storing a fifteen bit word. The word address counter 42 is reset to all zeros by the frame pulse on lead 30 and hence, can generate twenty-four unique addresses, with each address, as will be explained, indicative of a channel contained in the frame. The output from the word address counter 42 is also applied to the signaling register 27 to control operation of the register to assure that the correct signaling bits are associated with the correct channel or stages.

Thus, from the above description, it is now seen that the FIFO 40 receives as inputs, eight bits from the serial-to-parallel register 26 indicative of data, two bits indicative of the A and B bits or two signaling bits and five bits indicative of the address. At each storage location in the FIFO 40, a fifteen bit word as above formulated is stored. The word pulse command emanating on cable 32 is coupled to the shift in(SI) lead of the FIFO memory 40 and hence, upon receipt of the word pulse, the FIFO 40 is called to store a fifteen bit word, as above described. As one can ascertain, each word stored by the FIFO has its own address which is the five bit address emanating from the counter 42 and hence, each word is separately tagged.

Before further proceeding, a description of the operation of the FIFO 40 is warranted. Essentially, memories as 40 are known in the art and many examples are commercially available as suitable integrated circuit modules from various manufacturers. For example, a First In First Out memory as 40 is available from a company called Advanced Micro Devices as the AM 2841 which is a monolithic memory employing a stack capable of First In First Out operation. Such configurations are extremely well known in the art and operate as follows:

The built in control circuitry associated with the FIFO 40 causes each input word to stack up so that asynchronous input and output of words creates a "silo" storage effect. The (FIFO) memory as controlled contains sixty-four separate locations. When a first input word is received, the fifteen bit word is then directed to the bottom of the stack and will be the first word that comes out. The next word is stacked on top of this word and so on. The input ready (IR) output of the FIFO 40 is active whenever the FIFO is ready to accept an input word. Similarly, the output ready (OR) of the FIFO is active whenever a word is available at the output of the FIFO.

Shown coupled to the IR lead is a first overflow detector 50 which receives one input (IR) from the FIFO 40, the word pulse input from lead 32 and an alarm input from a fill counter 55, whose operation will be explained. There is also shown an underflow detector 51 which receives the OR output from the FIFO 40, the shift out (SO) pulse and the alarm output from the fill counter 55.

The functions of the overflow and underflow detectors 50 and 51 are to generate an alarm signal via the alarm OR gate 53, if a shift in is attempted while the FIFO 40 is full (contains sixty-four words) or a shift out is attempted, while the FIFO 40 is empty (contains no words). Hence, the overflow detector 50 provides an output when all storage locations of the FIFO are occupied, while the underflow detector 51 provides an output when no storage locations are occupied. Both outputs activate an alarm signal via gate 53.

The alarm signal from gate 53 is directed to the reset input of the fill counter 55. Upon receipt of an alarm condition, the fill counter 55 is reset to all zeroes. The resetting of the fill counter 55 immediately resets the entire memory via the master reset output and hence, clears all data from the memory. The fill counter then proceeds to count according to the word pulse input on lead 32 and will count in thirty-two unique states. During each count of the fill counter 55 a 15 bit word is applied to the memory at each of the separate 32 address locations or the FIFO 40 is filled to half its capacity. Thus 32 locations each contain a 15 bit word and since the memory has 64 locations it is half filled.

The fill counter 55, during the count procedure, inhibits shift out commands to the FIFO 40 via the AND gate 56 having its output coupled to the shift out terminal (SO) of FIFO 40. As soon as the fill counter reaches the count of thirty-two, the inhibit via gate 56 is removed and the reading of synchronous data from the FIFO 40 is accommodated by the readout pulse input to gate 56. The readout pulse is obtained from the local terminal and is in synchronization with the local terminal clock. Hence, each time a readout pulse appears at gate 56, the FIFO 40 provides a fifteen bit output consisting of five address bits, eight data bits associated with that address and the two signaling bits associated with the data.

As can be seen from the FIGURE, the sync loss lead from the frame and word sync recovery circuit 24 is also applied to gate 53 and hence, if sync is lost and not recovered, the gate 53 will again reset the fill counter and therefore prevent any shifting out of data from the FIFO 40. As long as sync is not recovered, there can be no data shift from the FIFO 40.

Basically, the circuit described operates as follows:

As described above, the readout pulse from the local terminal determines the frequency at which data is being read from the FIFO 40, which data is used by the local switching terminal to direct each channel to its proper location. As one can ascertain, since the output from the memory 40 contains a five bit address, this allows the local switch to simply route the data according to the unique address associated therewith and hence, the switch automatically and immediately knows the identification address for each and every word, both before the data enters the FIFO and as the data is read out of the FIFO. Hence, the routing of each data word to the proper location in the system is extremely straightforward.

As previously indicated, the readout pulse from the local terminal is derived from the local terminal clock, which clock is synchronized in frequency to the clock which was employed to formulate the data and to the clock which was recovered in clock recovery circuit 23. However, as described the data can possess jitter which essentially is a short term frequency error and hence, these errors effectively increase or decrease the frequency at which the data is effectively being received.

As above described, an increase in input frequency relative to output frequency means more data is entering a node than is leaving, while a decrease in input frequency means data is leaving the node faster then it is entering the node. Hence, in this circuit described, if there is an effective increase in input frequency due to phase jitter, the FIFO 40 will fill up or attempt to overflow as all the bits will be coming in at a faster rate then they could be read out. This condition is detected by the overflow detector 50 which activates the fill counter and clears the entire memory. The fill counter then allows the memory to half fill thirty-two locations and inhibits shift out commands to the FIFO 40 until it is half full and the alarm condition has cleared. Once this occurs, data continues to be read in a synchronous manner.

If the frequency of the input data has decreased, then data will be read out of the FIFO 40 at a much faster rate than it is being entered and hence, an underflow condition will result and this will be detected by detector 51 which again resets the fill counter 55 and hence, the FIFO 40 is half filled and with the loss of the alarm condition, data is read again.

The readout pulse from the local terminal is inhibited when the fill counter is operating to half fill the memory and thereafter, the pulse enables information to be read from the memory to synchronize the data transfer into the local terminal. The availability of the address word at the output of the FIFO provides automatic step control because each word has no dependence on any other word for identification.

Since each word is associated with its own address, the above circuit simplifies the circuit necessary in the local switching terminal to transfer data to the proper receiving channels. The automatic control of slips is further enhanced by assuring that each data word is independent due to its unique address and hence, this particular elastic store greatly simplifies the routing circuit employed in a prior art switching system.

The range of compensation or delay is a function of the length of the FIFO 40. Hence, sixty-four locations are sufficient to compensate for the typical jitter found in a telephone switching network. In any event, the memory could be made longer as one hundred twenty-eight or more locations to provide greater delay and therefore, greater compensation.

It is also understood that the elastic store technique can be employed with any type of multiplex signal containing n number of channels arranged in a serial pattern apart from the signaling used. For example, the above described system operated with signaling frames occurring at multiples of six or any other multiple including signaling bits associated with each word could be accommodated as well.

In essence, the concept can be employed in any synchronous network used to transfer multiplexed data across a boundary. The apparatus provides the automatic control of slips by making each data word independent and hence, also affords a major simplification of any additional control circuits used in the local switching terminal.

As one can ascertain, during a loss of sync or during a slip condition, no data can be transferred from the FIFO 40 to any subscriber as long as the alarm condition persists. In this manner the system consistently prevents unauthorized or wrong data to be transmitted via the FIFO 40 during a loss of sync or during a slip condition. Hence, when the alarm condition is cleared, data can only be routed to the correct location and based upon the address identification in a very simple and reliable manner.

It is, of course, understood that the local system clock and the transmitting system clock as described above, must run relatively at the same frequency and hence, the receiving and transmitting system operate at the same average frequency, as the above described apparatus will compensate for short term phase shift or jitter, but a chronic frequency mismatching will produce a common slip rate directly proportional to the mismatch and indirectly proportional to the length (64 words in the case discussed) of the FIFO. This, of course, is accommodated in a telephone switching system by conventionally designating one clock as a master clock and the other clock as a slave clock. It is understood in such systems that either the clock at the transmitting center or the receiving center may be the master or alternatively a third clock may be the master and clocks at the transmitting and receiving centers may be the slaves.

Moreover, at the receiving terminal, it is advantageous that there be phase and frame synchronization between the incoming data train and the local clock. This, of course, is achieved in this and other systems by the delay of the incoming data train so that the delayed frame signals in the train are in alignment with the framing pulse of the local clock.

I claim:

1. An elastic storage and synchronization apparatus for receiving a serial multiplexed signal of a given bit rate having a plurality of words, each of the same number of bits, with said words constituting a data frame having a fixed number of bits, comprising:

memory means having a plurality of addressable storage locations for storing at each location a given number of bits indicative of the number of bits in each of said words plus additional address bits manifesting the location of each of said words in said serial data stream, timing means responsive to said multiplexed signal for providing clock pulses indicative of said given bit rate in said signal, address access means coupled to said memory means and responsive to said clock pulses to provide at an output a plurality of unique address codes capable of accessing said memory means at each of said locations, to cause said memory means to store at each location said given number of bits, capacity detecting means coupled to said memory means and operative to detect the magnitude of stored words in said memory means to determine a change in the rate of received data as compared to a desired rate, including means responsive to said change to clear all bits stored in said locations of said memory means, and refilling means coupled to said capacity detecting means to fill a given number of said locations during a predetermined interval necessary to compensate for said change in rate.

2. The elastic storage and synchronization apparatus according to claim 1 wherein said memory means is a first in/first out (FIFO) memory whereby the first number of bits stored at any of said locations is the first number of bits that can be routed out of said memory means when a shift out of data stored is implemented.

3. The elastic storage and synchronization apparatus according to claim 2 further including read-out means coupled to said memory means and operative to cause said memory means to supply said stored number of bits for each of said words, whereby both data bits and address bits of each word are available from said memory means.

4. The elastic storage and synchronization apparatus according to claim 2 including means for inhibiting said read-out means during a determination of said rate change.

5. The elastic storage and synchronization apparatus according to claim 1 wherein said capacity detecting means further includes an overflow detector for detecting the total storage capacity of said memory means being full, and an underflow detector for detecting the absence of any storage in said memory means.

6. The elastic storage and synchronization apparatus according to claim 1 further comprising a serial-to-parallel converter adapted to receive said serial multiplexed signal and responsive to said clock pulses for converting said serial signal to a parallel signal for application of said word bits to said memory means in parallel.

7. The elastic storage and synchronization apparatus according to claim 1 further comprising alarm means coupled to said capacity detecting means and operative to provide an alarm signal upon determination of said change in rate.

8. The elastic storage and synchronization apparatus according to claim 1 wherein said serial multiplexed signal is of the type employed in telephony consisting of twenty-four eight bit words constituting one of plural data frames, with each word indicative of channel data, with each of said frames having the 193rd pulse designated as a frame pulse, with said bits having a repetition rate of about 1.5 megabits per second.

9. The elastic storage and synchronization apparatus according to claim 8 wherein
said multiplexed signal has predetermined frames reserved for signaling information by designating one bit in each word as a signaling bit.

10. The elastic storage and synchronization apparatus according to claim 9 further including
a signaling register means coupled to said memory means responsive to said signaling bits as contained in said predetermined frames for storing said bit to enable said signaling bits as stored by said signaling register means to be further stored with the respective associated words at said memory means locations.

11. The elastic storage and synchronization apparatus according to claim 8 further including
frame and word sync recovery means responsive to said multiplexed signal and said clock signal for determining frame synchronization of said multiplexed signal according to a predetermined frame pattern associated with said signal.

12. The elastic and storage apparatus according to claim 1 wherein
said refilling means includes a resettable counter adapted to count for said predetermined period under control of said timing means, with said capacity detecting means operative to reset said counter when said change in rate is detected.

* * * * *